United States Patent [19]

O'Neil-Bell

[11] Patent Number: 5,296,316

[45] Date of Patent: Mar. 22, 1994

[54] ALKALI METAL ENERGY CONVERSION DEVICE

[75] Inventor: Christopher O'Neil-Bell, Great Sankey, United Kingdom

[73] Assignee: Silent Power GmbH fur Energiespeichertechnik, Essen, Fed. Rep. of Germany

[21] Appl. No.: 934,475

[22] PCT Filed: Mar. 8, 1991

[86] PCT No.: PCT/GB91/00372

§ 371 Date: Sep. 14, 1992

§ 102(e) Date: Sep. 14, 1992

[87] PCT Pub. No.: WO91/14291

PCT Pub. Date: Sep. 19, 1991

[30] Foreign Application Priority Data

Mar. 15, 1990 [GB] United Kingdom ............... 9005802
May 22, 1990 [GB] United Kingdom ............... 9011442

[51] Int. Cl.$^5$ ............................................. H01M 10/39
[52] U.S. Cl. ................................................... 429/104
[58] Field of Search ........................ 429/104, 103, 193

[56] References Cited

U.S. PATENT DOCUMENTS

| 4,401,731 | 8/1983 | Steinleitner ........................ 429/104 |
| 4,546,056 | 10/1985 | Jessen et al. . | |
| 4,759,999 | 7/1988 | Maclachlin et al. ............... 429/104 |
| 5,118,574 | 6/1992 | Bindin et al. ....................... 429/104 |

FOREIGN PATENT DOCUMENTS

| 1041763B | 10/1958 | Fed. Rep. of Germany . |
| 1119153A | 6/1956 | France . |
| WO89/040- | | |
| 69A | 5/1989 | PCT Int'l Appl. . |
| 1169098A | 10/1969 | United Kingdom . |
| 2083278 | 3/1982 | United Kingdom . |
| 2083278A | 3/1982 | United Kingdom . |
| 2083686 | 3/1982 | United Kingdom . |
| 2083686A | 3/1982 | United Kingdom . |

OTHER PUBLICATIONS

Candidate Materials For The Sulfur Electrode Current Collectors—II. Aluminum and Its Alloys, R. P. Tischer et al., Corrosion Science, 26(5):371-375, 1986.

The Corrosion of Metals and Alloys by Sodium Polysulfide Melts at 350° C., Brown et al., Proceedings of the Symposium on Sodium-Sulfur Batteries, 87(5): 237-245 (1986).

Primary Examiner—Anthony Skapars
Attorney, Agent, or Firm—Finnegan, Henderson, Farabow, Garrett & Dunner

[57] ABSTRACT

Alkali metal energy conversion device comprising sealing components made of a metal or metal alloy substrate. A solid phase bonded coating of aluminum/silicon alloy is provided on an internal surface thereof. The aluminum/silicon alloy coating has the composition by weight of 0–0.5% Mg, 0–0.4% Cu, 0–1.0% Fe, 0.5–4.0% Si, up to 0.5% other trace elements, some oxygen present as an oxide and remainder Al.

16 Claims, 1 Drawing Sheet

ALKALI METAL ENERGY CONVERSION DEVICE

This invention relates to alkali metal energy conversion devices, such as for example alkali metal cells and particularly sodium sulphur cells. Such cells typically employ a solid electrolyte element separating cathodic and anodic reactants which are liquid at the cell operating temperature.

A known construction of device comprises an external casing, a solid electrolyte element dividing the interior of the casing into two electrode regions, an electrically insulating element joined to the electrolyte element, and at least one metal member sealed to the insulating element. This structure of sealing components typically forms part of the sealing arrangement for the device, sealing off the two electrode regions both from each other and from the ambient environment. For example, the external casing of the device may be of metal, so that any sealing of an electrode region requires a seal to be made between the metal of the casing and the electrolyte element. However the metal of the casing must be electrically insulated from the electrolyte element and the insulation is provided by the intervening electrically insulating element.

It will be appreciated that there are a number of options for the design of the external casing, in particular the choice of material to be used.

For example, reference may be made to U.S. Pat. No. 4,546,056 which shows an alkali metal energy conversion device having a particular arrangement of external casing, in this case comprising a cup shaped inner housing made of aluminium separated from a steel outer housing element by a layer of electrical insulation. The aluminium inner housing element serves as an electrical conductor whilst the steel outer housing element effectively provides support for the inner housing element. Aluminium has a number of properties which make it attractive for use in such alkali metal devices, for example low density, high electrical conductivity and resistance to corrosion from, for example, species such as polysulphides. Corrosion resistance against such species is due to the formation of a layer of aluminium sulphide, which is, however, electrically insulating. In some applications, it is know to arc, plasma or flame spray the surface of an aluminium can with a material which forms an electrically conductive layer in such an environment. Nichrome is often used for this.

It will be appreciated that an aluminium can cannot be used on its own for the external casing since the substantial overpressures generated would necessitate a can of substantial thickness and therefore cost. U.S. Pat. No. 4,546,056 addresses this by providing a thin aluminium can supported by an outer steel housing.

It is well known to hot dip aluminise steel to provide a composite material which is not only relatively economic to produce but also highly resistant to corrosion and sufficiently strong. Hitherto, such materials have not been employed in alkali metal energy conversion devices because they posess a number of severe drawbacks. The drawbacks associated with hot dipped aluminised material stem from there being an inter-metallic structure which is inevitably formed between the steel and the aluminium during coating. This inter-metalic structure is essentially columnar and comparatively brittle. Consequently, it is not possible to diffusion bond to a hot dip aluminised steel material since, at the temperatures involved, the inter-metallic alloy layer is weak and the material is unable to sustain the stresses placed on it. As a result, the material simply breaks away if diffusion bonding is attempted. A further problem is that hod dipped aluminised materials can become porous and thus allow corrosion.

Typically, the aluminium used in the hot dip process has a silicon content of approximately 10–14%. This has the effect of reducing the processing temperature required to coat the steel substrate by up to 60° C. The silicon is also used to aid in the formation of a more uniform intermetallic layer between the aluminium and steel. However, the use of such high levels of silicon, although acting as a processing aid, has been found to degrade the ability of the material to withstand temperatures above 550° C.

In view of the inherent problems with hot dipped aluminised materials, a variety of other aluminium coating processes have been tested such as plasma arc or flame sprayed coatings. All have been found to have deficiencies, particularly porosity, which render them unsuitable. As a consequence, attention has turned to chromised steels. Although these satisfy many of the requirements, the necessity of using high carbon steel produces a material of only limited ductility so that the external casing of an energy conversion device can only be drawn to a limited extent. Alloys such as Inconel 600 and Fecralloy have also been used for the external casings of metal energy conversion devices, but are costly.

In accordance with the present invention an alkali metal energy conversion device comprises sealing components made of a metal or metal alloy substrate having a solid phase bonded coating of aluminium/silicon alloy on an internal surface thereof, said aluminium/silicon alloy coating having the composition by weight of 0–0.5% Mg,
0–0.4% Cu,
0–1.0% Fe,
0.5–4.0% Si,
up to 0.5% other trace elements, some oxygen present as an oxide and remainder Al.

The composition of the aluminium/silicon alloy coating has been found to be critical if both good corrosion resistance and high temperature thermal stability are to be achieved. To this end it has been found that an aluminium silicon alloy having the above composition satisfies both criteria.

The aluminium/silicon alloy coating may be bonded to the metal substrate at room temperature. Techniques for this include roll bonding and friction surfacing. All are described as "solid phase" bonding techniques in as much as the coating is not applied in molten condition. Such techniques avoid the formation of a brittle intermetallic layer. A preferred bonding process is roll bonding. It should be noted however that as a consequence of the roll bonding process a thin layer of almost pure Si may be deposited on the outer surfaces of the aluminium/silicon alloy. This is not included in the chemical analysis of the coating. The pure Si layer comes from a releasing agent used in the cold rolling process.

The bond between the alloy coating and the substrate is considerably stronger than the bond formed by hot dip aluminising. In addition, it has been found that the roll bonded coating has low porosity.

The use of an aluminium silicon alloy as the coating material offers the benefit, over the more usual commercially pure aluminium roll bonded coating, of giving a much more corrosion resistant layer. The mechanism for this improved resistance is not fully understood but it has been postulated that it is due to the Si producing or aiding in the formation of a more stable or tenacious sulphide coating on the surface of the aluminium.

In another aspect the invention provides an alkali metal energy conversion device having an external casing, a solid electrolyte element in the casing to divide the interior into electrode regions, an electrically insulating element joined to the electrolyte element and means secured to the insulating element and the external casing to seal off one of the electrode regions, wherein at least part of the external casing is made of a metal or metal alloy substrate having a solid phase bonded coating of aluminium/silicon alloy on an internal surface thereof, said aluminium/silicon alloy coating having the composition by weight of:

0–0.5% Mg,
0–0.4% Cu,
0–1.0% Fe,
0.5–4.0% Si,
up to 0.5% other trace elements, some oxygen present as an oxide and remainder Al.

The means secured to the insulating element may also comprise components made of said substrate having said coating, as may any further components exposed to corrosive species.

The substrate is preferably iron or nickel based and conveniently steel. The preferred bonding process is again roll bonding.

The invention is therefore based on the finding that the prior art teaching against the use of aluminium/steel composites for such components on the grounds of serious deficiencies was incorrect in respect of room temperature bonded composites having the above defined formulation.

An important further development of this invention is to make the above referred coating of aluminium/silicon alloy relatively thick, that is more that 50 microns. Such thicker coatings are especially useful since it has been found that the life of alkali metal energy conversion devices, particularly sodium/sulphur cells, can be extended by forming the coating of adequate thickness. Preferably the coating thickness is equal to or greater than 60 microns and more preferably equal to or greater than 100 microns.

An Example of the invention will be described with reference to the accompanying drawing in which:

BRIEF DESCRIPTION OF THE DRAWING

Referring to FIG. 1 of the drawings, a sodium sulphur cell of the central sodium type is illustrated comprising a cylindrical beta alumina electrolyte tubular element 14 which is integrally closed at one end as shown and has its other end closed by an alpha alumina end plate 15. The end plate 15 is sealed, by glazing to one end of the electrolyte eielment 14 and provides electrical insulation as well as a mechanical seal. Within the sealed assembly there may be either an iron foil element (not shown) or a mesh element (not shown) closely adjacent the inner cylindrical surface of the electrolyte tube 14 to leave a capillary region adjacent that surface constituting a wick. The interior of the assembly is filled with sodium 20 which is liquid at the operating temperature of the cell; the capillary maintains a layer of liquid sodium over the inner surface of the electrolyte tube 14. A current collector rod 21 extends into this sodium, passing through an aperture 22 in the alpha aluminia element 15.

Figure 1:
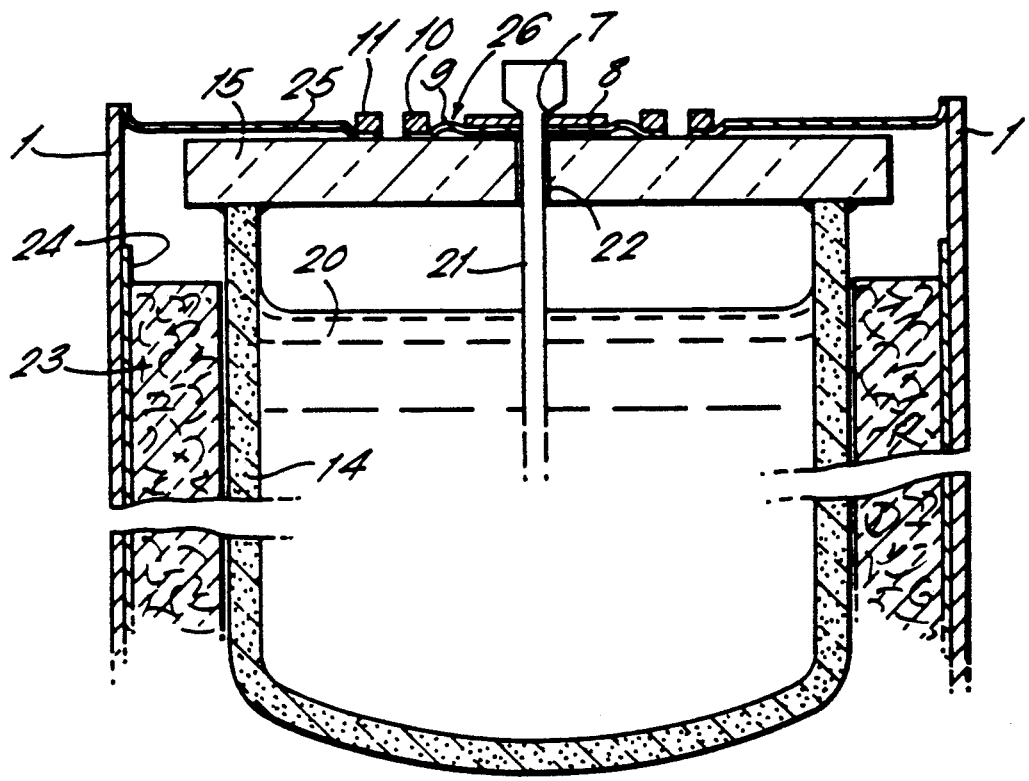
FIG. 1 is a diagrammatic longitudinal cross section through a known arrangement of a sodium sulphur cell.

Around the outside of the cylindrical portion of the electrolyte element 14 is a cathode structure of annular form constituted by three third-cylindrical elements 23 and a further cup shaped base element (not shown) of carbon fibre material impregnated with sulphur. These elements lie between the electrolyte tube 14 and an outer metal case 1, the cathode elements 23 being in contact both with the beta alumina electrolyte tube 14 and the case 1. These cathode elements may be formed in the known way by compression of the fibre material which is impregnated with hot sulphur, the sulphur then being cooled so as to be solidified and thereby to hold the element in compression to facilitate assembly of the cell. When the cell is raised to the operating temperature, typically 350°, the sulphur melts and the resilience of the fibre material causes the elements 23 to make good contact with the case 1 and the electrolyte 14.

In this example of the invention, the case 1 is made from a steel substrate having a roll bonded coating of aluminium/silicon alloy on an internal surface. The coating is plasma sprayed with nichrome.

The bulk analysis of the aluminium silicon alloy coating is, by weight:
0.9%—Fe
1.0–1.5%—Si
0.3%—Cu
0.2%—Mg
96.2%—Al
1.3%—O The oxygen present is probably retained as an oxide of e.g. Al. There may typically be in addition up to 0.5% trace elements in the formulation. As a result of the roll bonding process, there is a layer of almost pure silicon on the surface of the alloy, resulting from the releasing agent used during cold rolling. The casing 1 is highly resistant to corrosion, and extremely strong. Importantly also, the coating is resistant to the formation of a brittle intermetallic layer up to temperatures of about 615° C. Growth of intermetallics is both temperature and time dependent so that during relatively rapid high temperature (approximately 600° C.) processing steps (e.g. by thermocompression bonding or resistance welding), the growth of intermetallics is not a significant problem.

Samples of the roll bonded material have been maintained at approximately 600° C. for 2 weeks and showed no substantial growth of intermetallic alloys. At the operating temperature of an sodium/sulphur cell, i.e. approximately 350° C., samples have exhibited no sign of significant intermetallics for substantially greater periods. Conveniently, at higher temperatures of approximately 700° C., the growth of intermetallics is sufficiently rapid so that significant quantities of aluminium are conserved from burning. This is particularly advantageous since an aluminium fire in a given cell is potentially a problem for the entire group of cells.

The preferred choice of thickness for the aluminium/silicon alloy coating has been found to be approximately 60 micrometers thick. A thickness of 120 microns provides even better performance, extending the life of the cell by as much as double.

The alpha alumina plate 15 is formed as a disc with a central aperture 22. This disc is sealed to the case 1 by means of an annular metal member 25 formed of the steel substrate with the roll bonded aluminium/silicon alloy coating, although Inconel 600 or Fecralloy A may also be used. This member 25 is secured by welding to the periphery of the housing and by thermocompression bonding to the disc 15 in an annular region around the centralaperture 22. The central compartment of the cell is closed by means of a current collector 21 passing through the aperture 22 and secured to an inner metal element 9 also bonded to the alpha alumina around the aperture 22 by means of thermocompression bonding. The element 9 is spaced radially inwardly from the annular metal member 25 so that they are electrically insulated from one another by the alpha alumina disc. The element 9 may also be made of the steel substrate with the roll bonded aluminium/silicon alloy coating.

In the manufacture of the cell, the metal members 25 and 9 are bonded to the alpha alumina end plate 15 before further assembly of the cell. This bonding is effected by compression at an elevated temperature and under vacuum conditions or in an inert atmosphere.

The inner metal member 9 is of relatively small radial extent and the seal is effected by applying pressure through a backing washer 10 to seal the outer peripheral edge of inner metal member 9. The material of the washer 10 is such as to become bonded to the member. The outer annular metal member 25 is sealed to the alpha alumina lid over a small annular region around the inner member but slightly spaced therefrom by applying pressure through a further backing washer 11.

A strengthening washer 8 is also thermocompression bonded to the upper surface of the inner metal member, annular sheet 9. The strengthening washer 8 has a thickness greater than the thickness of the member 9 and serves to keep the inner peripheral portion of the sheet 9 substantially rigid. The outer diameter of the washer 8 is substantially less than the diameter of the backing washer 10, corresponding to the position of the seal between the member 9 and the alpha alumina lid 15.

The central current collector 21 extending through the aperture 22 has an annular shoulder 7 which seals against the inner edge of the strengthening washer 8 and is welded thereto to provide the necessary hermetic seal.

Because the annular sheet 9 is bonded to the aplha alumina lid 15 only about the outer periphery of the sheet 9, some flexibility is provided between the seal with the central current collector 21 and the seal to lid 15. The material of the sheet 9 is made sufficiently thin to permit some distortion in the region indicated generally at 26 between the backing washer 10 and the strengthening washer 8.

I claim:

1. Alkali metal energy conversion device comprising sealing components made of a metal or metal alloy substrate having a solid phase bonded coating of aluminium/silicon alloy on an internal surface thereof, said aluminium/silicon alloy coating having the composition by weight of 0–0.5% Mg,
0–0.4% Cu,
0–1.0% Fe,
0.5–4.0% Si
up to 0.5% other trace elements, some oxygen present as an oxide and remainder Al.

2. Alkali metal energy conversion device having an external casing, a solid electrolyte element in the casing to divide the interior into electrode regions, an electrically insulating element joined to the electrolyte element and means secured to the insulating element and the external casing to seal off one of the electrode regions, wherein at least part of the external casing is made of a metal or metal alloy substrate having a solid phase bonded coating of aluminium/silicon alloy on an internal surface thereof, said aluminium silicon alloy coating having the composition by weight of 0–0.5% Mg,
0–0.4% Cu,
0–1.0% Fe,
0.5–4.0% Si,
up to 0.5% other trace elements, some oxygen present as an oxide and remainder Al.

3. Alkali metal energy conversion device as claimed in claim 2 wherein the means secured to the insulating element comprises components made of said substrate having said coating.

4. Alkali metal energy conversion device as claimed in any preceding claim wherein said substrate having said coating has a thin layer of silicon on the surface of the aluminium/silicon alloy.

5. Alkali metal energy conversion device as claimed in claim 1, 2, or 3 wherein said substrate is iron or nickel based.

6. Alkali metal energy conversion device as claimed in claim 5 wherein said substrate contains chromium.

7. Alkali metal energy conversion device as claimed in claim 5 wherein the substrate is steel.

8. Alkali metal energy conversion device as claimed in claim 1, 2 or 3 wherein said coating is a roll-bonded coating.

9. Alkali metal energy conversion device as claimed in claim 1, 2 or 3 wherein said coating has a thickness greater than 50 microns.

10. Alkali metal energy conversion device as claimed in claim 9 wherein said coating has a thickness equal to or greater than 60 microns.

11. Alkali metal energy conversion device as claimed in claim 10 wherein said coating has a thickness equal to or greater than 100 microns.

12. Alkali metal energy conversion device as claimed in claim 8 wherein said coating has a thickness greater than 50 microns.

13. Alkali metal energy conversion device as claimed in claim 12 wherein said coating has a thickness equal to or greater than 60 microns.

14. Alkali metal energy conversion device as claimed in claim 13, wherein said coating has a thickness equal to or greater than 100 microns.

15. Alkali metal energy conversion device as claimed in claim 6 wherein the substrate is steel.

16. Alkali metal energy conversion device as claimed in claim 1 or 2 wherein the composition by weight of Mg is $0 < \% \text{Mg} \leq 0.5$.

* * * * *